(12) United States Patent
Babu et al.

(10) Patent No.: US 9,508,381 B2
(45) Date of Patent: Nov. 29, 2016

(54) DVR SCHEDULE COLLABORATION METHODS AND SYSTEMS

(71) Applicant: Verizon Patent and Licensing Inc., Arlington, VA (US)

(72) Inventors: Narendra B. Babu, Chennai (IN); Syed Mohasin Zaki, Chennai (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 301 days.

(21) Appl. No.: 14/023,431

(22) Filed: Sep. 10, 2013

(65) Prior Publication Data
US 2015/0071621 A1    Mar. 12, 2015

(51) Int. Cl.
*H04N 5/76* (2006.01)
*G11B 19/02* (2006.01)

(52) U.S. Cl.
CPC ................... *G11B 19/02* (2013.01)

(58) Field of Classification Search
CPC .......... H04N 21/252; H04N 21/42204; H04N 21/4668; H04N 21/47214; Y10S 707/99933; G11B 19/02
USPC ........................................................ 386/291
See application file for complete search history.

(56) References Cited

U.S. PATENT DOCUMENTS

| | | | |
|---|---|---|---|
| 6,968,364 B1 * | 11/2005 | Wong | H04N 5/765 348/E7.071 |
| 7,895,625 B1 * | 2/2011 | Bryan et al. | 725/46 |
| 2002/0174428 A1 * | 11/2002 | Agnihotri et al. | 725/46 |
| 2006/0085818 A1 * | 4/2006 | Bodlaender et al. | 725/46 |
| 2008/0134039 A1 * | 6/2008 | Fischer et al. | 715/733 |
| 2009/0150935 A1 * | 6/2009 | Peters | G06Q 30/02 725/46 |
| 2010/0175085 A1 * | 7/2010 | Seol | 725/39 |
| 2011/0063317 A1 * | 3/2011 | Gharaat | G06Q 30/0244 345/545 |
| 2013/0136425 A1 * | 5/2013 | Herby | H04N 5/76 386/296 |

* cited by examiner

*Primary Examiner* — David Harvey

(57) ABSTRACT

An exemplary method includes a DVR schedule collaboration system 1) maintaining data representative of a plurality of DVR schedules associated with a plurality of users, 2) creating a master DVR schedule based on the plurality of DVR schedules, and 3) facilitating creation of a personal DVR schedule by a user in accordance with at least one of the master DVR schedule and one or more of the DVR schedules associated with the plurality of users. Corresponding methods and systems are also disclosed.

19 Claims, 11 Drawing Sheets

300

| Program | Time Slot | Number of Occurrences |
|---|---|---|
| Program A | Mondays 3:00-4:00 pm | 95 |
| Program B | Mondays 3:30-4:30 pm | 93 |
| Program C | Mondays 4:30-5:00 pm | 90 |
| Program D | Mondays 5:00-6:00 pm | 88 |

Fig. 3

Master DVR Schedule

| Program | Type | Info | |
|---|---|---|---|
| Program E | Series | Mondays 3pm-4pm Ch. 110 | Add to Personal DVR Schedule (502-1) |
| Program F | Event | Sunday 6pm-10pm Ch. 013 | Add to Personal DVR Schedule (502-2) |
| Program G | Series | Saturdays 11am-12pm Ch. 212 | Add to Personal DVR Schedule (502-3) |
| Program H | Series | Thursdays 3pm-3:30pm Ch. 256 | Add to Personal DVR Schedule (502-4) |

Use Master DVR Schedule (504)

DVR SCHEDULE COLLABORATION METHODS AND SYSTEMS

BACKGROUND INFORMATION

Digital video recording ("DVR") devices allow users to record media content programs (e.g., television programs, etc.) and then view or otherwise experience the recorded media content programs. For example, a user may create a DVR schedule that includes instructions for a DVR device to record certain media content programs as they are broadcast or otherwise provided for presentation by a media content provider. The user may then view the recorded media content programs at his or her convenience.

Unfortunately, it is often difficult and/or time-consuming for a user to populate a DVR schedule with media content programs that he or she would most enjoy viewing. For example, a user may have access to hundreds or even thousands of channels by way of a set-top box device, but be interested in recording only a small fraction of the media content programs offered by way of these channels. Locating and including these media content programs in a DVR schedule can be cumbersome and time-consuming for the user, and can often lead to missed viewing opportunities.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 3 shows an exemplary table that lists various media content programs that may be included in one or more DVR schedules upon which a master DVR schedule is based according to principles described herein.

FIGS. 4-7 illustrate various interfaces that may be presented to a user according to principles described herein.

DETAILED DESCRIPTION OF PREFERRED EMBODIMENTS

Figure 1:
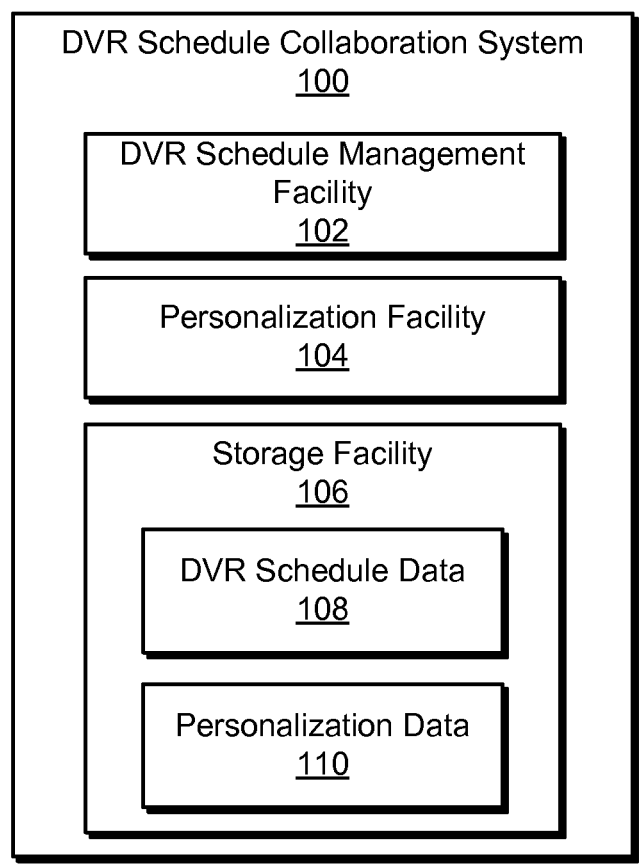
FIG. 1 illustrates an exemplary DVR schedule collaboration system according to principles described herein.

DVR schedule collaboration methods and systems are described herein. As will be described below, a DVR schedule collaboration system may 1) maintain data representative of a plurality of DVR schedules associated with (e.g., created by) a plurality of users, 2) create a master DVR schedule based on the plurality of DVR schedules, and 3) facilitate creation of a personal DVR schedule by a user in accordance with the master DVR schedule and/or one or more of the DVR schedules associated with the plurality of users. As will be described below, the personal DVR schedule may include instructions for a DVR device associated with the user to record one or more media content programs during one or more time slots (e.g., during one or more broadcast time slots).

The methods and systems described herein may allow a user to effectively and efficiently populate a DVR schedule with media content programs that are of interest to the user. To illustrate, a particular user may subscribe to a media content distribution service (e.g., a subscriber television network service) and acquire (e.g., lease or buy) a DVR device (e.g., a set-top box device with DVR capabilities) to access media content provided by the media content distribution service. Upon acquiring the DVR device, the user may desire to create a personal DVR schedule that governs a recording operation of the DVR device (e.g., by specifying a plurality of media content programs available by way of the media content distribution service that are to be recorded by the DVR device). However, it may be difficult and/or time-consuming for the user to manually locate media content programs of interest to the user and/or manually schedule media content programs for recording by the DVR device.

Hence, in accordance with the methods and systems described herein, the user may select an option to access (e.g., view) a master DVR schedule that, for example, includes a set of "most popular" media content programs as selected by a community of users (e.g., a group of subscribers to the media content distribution service). The user may additionally or alternatively access one or more DVR schedules created by one or more other users (e.g., one or more other subscribers to the media content distribution service). By accessing the master DVR schedule and/or the one or more DVR schedules created by the one or more other users, the user may readily identify and select media content programs that are potentially of interest to the user for inclusion in the user's personal DVR schedule. For example, the user may select an option to use the master DVR schedule or a DVR schedule associated with another user as the user's personal DVR schedule. Other manners in which the user may create a personal DVR schedule based on the master DVR schedule and/or one or more DVR schedules associated with other users will be described in more detail below.

As used herein, the term "media content program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media content, advertisement, video, movie, audio program, radio program, or any segment, component, or combination of these or other forms of media content that a user may access by way of a DVR device. A "DVR device" may include any device or combination of devices configured to provide DVR functionality. For example, a DVR device may include a set-top box device, a receiver, a personal computer, a mobile device (e.g., a mobile phone and/or tablet computer), a personal-digital assistant device, a gaming device, a television device, a server, etc. A DVR device may be local (i.e., located within a premises of a user) or remote (e.g., located remote from a premises of a user).

FIG. 1 illustrates an exemplary DVR schedule collaboration system 100 ("system 100"). As shown, system 100 may include, without limitation, a DVR schedule management facility 102, a personalization facility 104, and a storage facility 106 selectively and communicatively coupled to one another. Storage facility 106 may be configured to maintain DVR schedule data 108 generated and/or used by DVR schedule management facility 102, and personalization data 110 generated and/or used by personalization facility 104. Storage facility 106 may maintain additional or alternative data as may serve a particular implementation. It will be recognized that although facilities 102-106 are shown to be separate facilities in FIG. 1, any of facilities 102-106 may be combined into fewer facilities, such as into a single facility, or divided into more facilities as may serve a particular implementation.

DVR schedule management facility 102 may be configured to perform various DVR schedule management operations. For example, DVR schedule management facility 102 may maintain data representative of a plurality of DVR schedules associated with (e.g., created by) a plurality of users. This may be performed in any suitable manner. For example, DVR schedule management facility 102 may receive data representative of the plurality of DVR schedules from the plurality of users and store the received data (e.g., as DVR schedule data 108).

Figure 2:
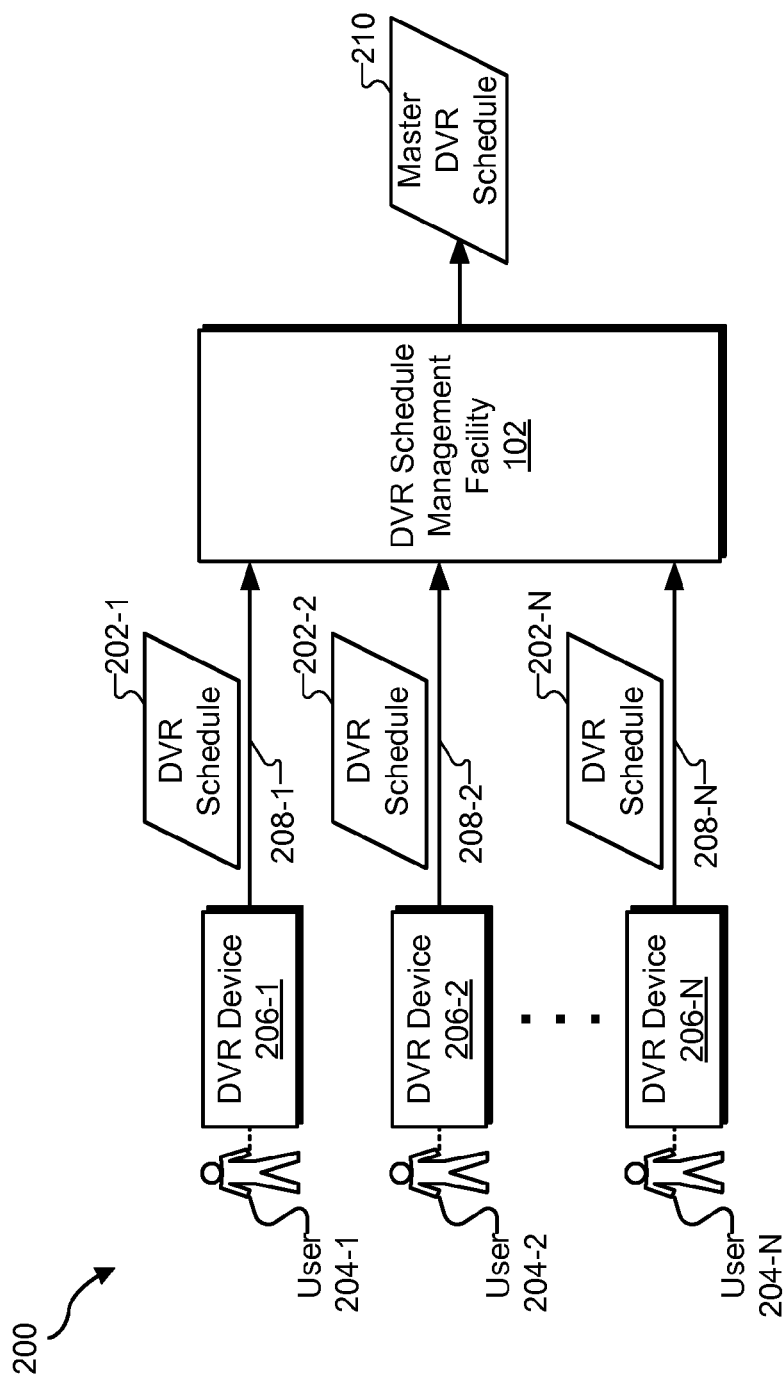
FIG. 2 shows an exemplary configuration wherein a master DVR schedule may be created based on a plurality of DVR schedules associated with a plurality of users according to principles described herein.

To illustrate, FIG. 2 shows an exemplary configuration 200 in which DVR schedule management facility 102 receives data representative of a plurality of DVR schedules 202 (e.g., DVR schedules 202-1 through 202-N) from a plurality of users 204 (e.g., users 204-1 through 204-N). As shown, each user 204 may be associated with (e.g., use) a DVR device 206 (e.g., DVR devices 206-1 through 206-N). In some examples, each user 204 may use a DVR device 206 to create a DVR schedule 202. For example, user 204-1 may use DVR device 206-1 to create DVR schedule 202-1.

In some examples, each user 204 may publish his or her DVR schedule 202. As used herein, "publishing a DVR schedule" refers to any action taken by a user to share the DVR schedule with DVR schedule management facility 102 (e.g., by uploading data representative of the DVR schedule to DVR schedule management facility 102). In response to users 204 publishing DVR schedules 202, data representative of each DVR schedule 202 may be transmitted to DVR schedule management facility 102 (e.g., by DVR devices 206), as illustrated by arrows 208-1 through 208-N. DVR schedule management facility 102 may receive the data representative of DVR schedules 202 from the plurality of users and store the received data (e.g., as DVR schedule data 108). It will be recognized that DVR schedule management facility 102 may alternatively receive data representative of DVR schedules 202 in any other manner (e.g., from a device or system other than DVR devices 206).

In some examples, DVR schedule management facility 102 may maintain data representative of a DVR schedule associated with a particular user only if the user elects to publish the DVR schedule. Hence, by choosing not to publish a DVR schedule, a user may keep his or her DVR schedule private.

Once a user has published a DVR schedule, he or she may modify the DVR schedule (e.g., by adding or removing media content programs from the DVR schedule). In some examples, DVR schedule management facility 102 may detect the modification and, based on the modification, update data representative of the DVR schedule as maintained by DVR schedule management facility 102. The detecting and updating may be performed automatically in response to the modification of the DVR schedule by the user. Alternatively, the detecting and updating may only be performed in response to a re-publishing of the DVR schedule by the user.

For example, user 204-1 may remove a certain media content program scheduled for recording from DVR schedule 202-1 (e.g., by accessing DVR device 206-1 and selecting an option to remove the media content program from DVR schedule 202-1). DVR schedule management facility 102 may detect the modification and update data representative of DVR schedule 202-1 as maintained by DVR schedule management facility 102 to reflect the modification made by user 204-1 to DVR schedule 202-1.

DVR schedule management facility 102 may be further configured to create a master DVR schedule based on the plurality of DVR schedules maintained by DVR schedule management facility 102. For example, with reference to FIG. 2, DVR schedule management facility 102 may create a master DVR schedule 210 based on DVR schedules 202.

DVR schedule management facility 102 may create a master DVR schedule based on a plurality of DVR schedules maintained by DVR schedule management facility 102 in any suitable manner. For example, DVR schedule management facility 102 may use the DVR schedules to identify a set of "most popular" media content programs and select the set of most popular media content programs for inclusion in the master DVR schedule. As used herein, a "most popular" media content program refers to a media content program that is included or specified in a relatively high number of DVR schedules upon which the master DVR schedule is based. In other words, a "most popular" media content program has been selected by a relatively high number of users for inclusion in the users' individual DVR schedules. For example, the most commonly specified media content program in DVR schedules 202 may be referred to as the most popular media content program out of all of the media content programs specified in DVR schedules 202. Likewise, the second most commonly specified media content program in DVR schedules 202 may be referred to as the next most popular media content program out of all of the media content programs specified in DVR schedules 202.

DVR schedule management facility 102 may use DVR schedules 202 to identify a set of most popular media content programs (e.g., a predetermined total number of media content programs, a predetermined number of media content programs per time slot, etc.) and select the set of most popular media content programs for inclusion in master DVR schedule 210 in any suitable manner. To illustrate, each DVR schedule 202 may include data specifying a plurality of media content programs selected by a particular user (e.g., a user included in users 204) for recording during a plurality of time slots. As used herein, the term "time slot" refers to a period of time during which a media content program is broadcast or otherwise provided for presentation by a media content distribution service (e.g., in accordance with a predefined broadcast or presentation schedule). DVR schedule management facility 102 may identify a media content program that is most commonly specified in DVR schedules 202 and designate the identified media content program as the most popular media content program. DVR schedule management facility 102 may then select the identified media content program for inclusion in master DVR schedule 210 at a time slot associated with the identified media content program (e.g., at a time slot at which the identified media content program is to be broadcast or otherwise provided for presentation). A next most popular media content program may be identified and selected for inclusion in master DVR schedule 210 in a similar manner. This process may be repeated until each available time slot included in master DVR schedule 210 (e.g., each available time slot during a particular period of time, such as a day or week) is filled with a media content program.

To illustrate, FIG. 3 shows an exemplary table 300 that lists various media content programs (e.g., media content programs labeled "program A" through "program D") that may be included in one or more of DVR schedules 202. It will be recognized that additional or alternative media content programs may be included in one or more of DVR schedules 202 as may serve a particular implementation.

FIG. 3 also shows time slots corresponding to each media content program. For example, table 300 indicates that the media content program labeled "program A" is scheduled to be presented each Monday between 3:00 and 4:00 pm, the media content program labeled "program B" is scheduled to be presented each Monday between 3:30 and 4:30 pm, the media content program labeled "program C" is scheduled to be presented each Monday between 4:30 and 5:00 pm, and the media content program labeled "program D" is scheduled to be presented each Monday between 5:00 and 6:00 pm.

As mentioned, DVR schedule management facility 102 may determine a frequency of occurrence of each media content program in DVR schedules 202. In other words, DVR schedule management facility 102 may determine how many DVR schedules 202 include each media content program. This information is labeled in FIG. 3 as "Number of Occurrences." For example, table 300 indicates that the media content program labeled "program A" is included in ninety-five DVR schedules 202, the media content program labeled "program B" is included in ninety-three DVR schedules 202, the media content program labeled "program C" is included in ninety DVR schedules 202, and the media content program labeled "program D" is included in eighty-eight DVR schedules 202. For purposes of this example, it will be assumed that the media content program labeled "program A" is the most popular media content program included in DVR schedules 202, the media content program labeled "program B" is the second most popular media content program included in DVR schedules 202, the media content program labeled "program C" is the third most popular media content program included in DVR schedules 202, and the media content program labeled "program D" is the fourth most popular media content program included in DVR schedules 202.

Based on the data presented in table 300, DVR schedule management facility 102 may select one or more of the media content programs listed in table 300 for inclusion in master DVR schedule 310. In some examples, DVR schedule management facility 102 may select media content programs for inclusion in master DVR schedule 210 based solely on the number of occurrences of each media content program in DVR schedules 202. In these examples, media content programs may be selected for inclusion in master DVR schedule 210 even if their corresponding time slots overlap. For example, the media content programs labeled "program A" and "program B" may both be selected for inclusion in master DVR schedule 310 even though their corresponding time slots overlap by thirty minutes. A master DVR schedule that includes overlapping media content programs may be desirable for DVR devices that have a relatively high number of tuners (e.g., more than two tuners).

In some alternative examples, DVR schedule management facility 102 may select media content programs for inclusion in master DVR schedule 210 in a manner such that time slots corresponding to the media content programs do not overlap. For example, with reference to FIG. 3, the media content program labeled "program B" may be excluded from being included in master DVR schedule 210 because its corresponding time slot overlaps with that of the media content program labeled "program A". A master DVR schedule that includes non-overlapping media content programs (e.g., a master DVR schedule that is limited to include only non-overlapping media content programs) may be desirable for DVR devices that have a limited number of tuners (e.g., one or two tuners).

In some examples, DVR schedule management facility 102 may personalize a master DVR schedule to a particular user. For example, a user may provide input representative of the recording capabilities of his or her DVR device (e.g., how many tuners the DVR device has). In response, DVR schedule management facility 102 may determine how many media content programs with overlapping time slots may be included in the master DVR schedule.

Additionally or alternatively, DVR schedule management facility 102 may personalize a master DVR schedule to a particular user by identifying and selecting one or more media content programs for inclusion in the master DVR schedule that have a media content attribute specified by the user. As used herein, the term "media content attribute" may refer to any characteristic of a media content program such as, but not limited to, genre (e.g., soap operas, sporting events, etc.), resolution (e.g., high definition), personnel (e.g., actors, directors, and/or other users associated with the media content program), etc.

To illustrate, a user may desire to access a master DVR schedule that includes media content programs associated with the actor "Tom Hanks". Accordingly, the user may provide "Tom Hanks" as input. In response, DVR collaboration facility 102 may identify media content programs that are associated with "Tom Hanks" (e.g., by analyzing metadata associated with the media content programs). DVR schedule management facility 102 may then select one or more of the identified media content programs for inclusion in the master DVR schedule.

In another example, a user may wish to access a master DVR schedule that includes media content programs that are categorized as game shows (e.g., "The Price is Right", "Family Feud", "Jeopardy", etc.). To do so, the user may provide input representative of the "game shows" category. In response, DVR collaboration facility 102 may identify media content programs that are categorized as being "game shows" and select one or more of the identified media content programs for inclusion in the master DVR schedule.

Additionally or alternatively, DVR schedule management facility 102 may personalize a master DVR schedule to a particular user by allowing the user to select which users' DVR schedules are used to create the master DVR schedule. For example, the user may specify that only those DVR schedules associated with a group of social media contacts of the user are to be used to create the master DVR schedule.

Returning to FIG. 1, personalization facility 104 may be configured to facilitate creation of a personal DVR schedule by a user in accordance with any of the DVR schedules maintained by DVR schedule management facility 102 (e.g., the master DVR schedule and/or one or more of the DVR schedules associated with the plurality of users). This may be performed in any suitable manner. For example, personalization facility 104 may be configured to present the user with an interface (e.g., a graphical user interface ("GUI")) that allows the user to selectively access the master DVR schedule and the one or more DVR schedules associated with the plurality of users.

Figure 4:
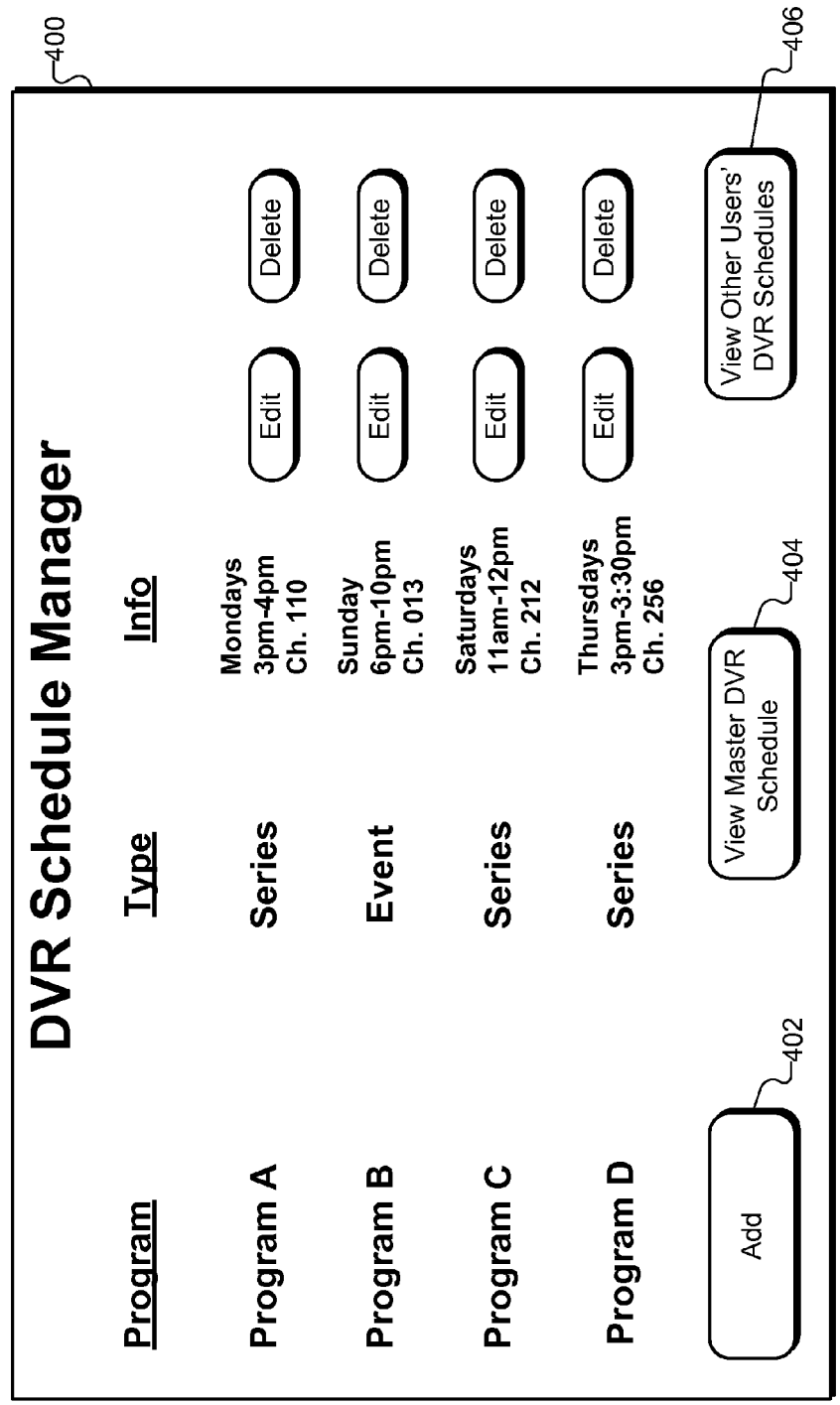

To illustrate, FIG. 4 shows an exemplary interface 400 that may be presented to the user and that may allow the user to selectively access the master DVR schedule and the one or more DVR schedules associated with the plurality of users. Interface 400, as well as the other interfaces described herein, may be presented to the user in any suitable way. For example, interface 400 may be presented by way of a display (e.g., a television, display screen, etc.) associated with a DVR device.

As shown in FIG. 4, interface 400 may facilitate creation of a personal DVR schedule by a user. For example, interface 400 shows that the user has selected four media content programs (i.e., the media content programs labeled "program A" through "program D") for inclusion in the personal DVR schedule. To manually add one or more other media content programs to the DVR schedule, the user may select an option 402. Alternatively, the user may select option 404 to access the master DVR schedule or option 406 to access one or more DVR schedules associated with one or more individual users.

FIG. 5 shows an exemplary interface 500 that may be presented in response to the user selecting option 404 to access the master DVR schedule. As shown, interface 500 may include a list of media content programs (e.g., the media content programs labeled "program E" through "program H") that have been selected for inclusion in the master DVR schedule. Additional information associated with each media content program (e.g., whether each media content program is part of a series or a single event and a time slot at which each media content program is to be broadcast or otherwise made available for presentation) may also be displayed within interface 500.

In some examples, the user may use interface 500 to select one or more media content programs included in the master DVR schedule for inclusion in the user's personal DVR schedule. For example, to select the media content program labeled "program E" for inclusion in the user's personal DVR schedule, the user may select option 502-1. Likewise, the user may select the media content program labeled "program F" for inclusion in the user's personal DVR schedule by selecting option 502-2, the media content program labeled "program G" for inclusion in the user's personal DVR schedule by selecting option 502-3, and/or the media content program labeled "program H" for inclusion in the user's personal DVR schedule by selecting option 502-4. In response to a user selection of one of options 502-1 through 502-4, personalization facility 104 may automatically include the corresponding media content program in the user's personal DVR schedule. For example, in response to a user selection of option 502-1, personalization facility 104 may automatically include the media content program labeled "program E" in the user's personal DVR schedule.

In some examples, personalization facility 104 may allow the user to use (i.e., designate) the master DVR schedule as the user's personal DVR schedule. For example, option 504 may be presented within interface 500. In response to a user selection of option 504, personalization facility 104 may designate the master DVR schedule as the user's personal DVR schedule (e.g., by overwriting what was originally included in the personal DVR schedule with the contents of the master DVR schedule).

Figure 6:
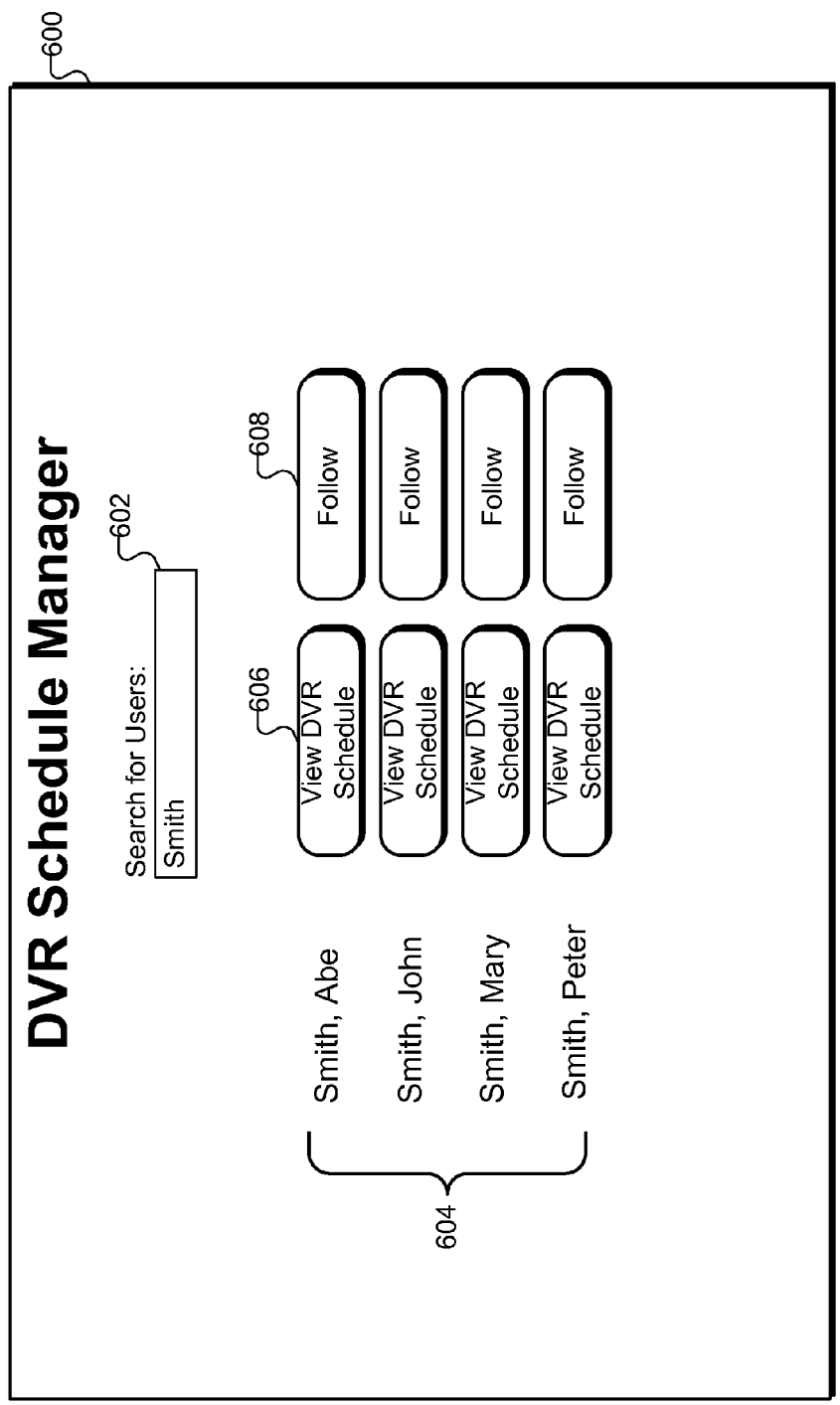

Returning to FIG. 4, the user may access DVR schedules (e.g., individual DVR schedules upon which the master DVR schedule is based) associated with other users by selecting option 406. FIG. 6 illustrates an exemplary interface 600 that may be presented in response to a selection by the user of option 406.

As shown, interface 600 may include a search box 602 into which the user may input one or more search terms in order to access DVR schedules associated with one or more users. For example, FIG. 6 shows that the user has input a search term of "Smith." In response, personalization facility 104 may present a list 604 of users included in the plurality of users that each have the name of "Smith". The user may then select an option (e.g., option 606) to access a DVR schedule associated with a particular user included in list 604 and/or an option (e.g., option 608) to follow a particular user included in list 604. It will be recognized that interface 600 may include additional or alternative options configured to facilitate access by the user to one or more DVR schedules associated with one or more other users.

Figure 7:
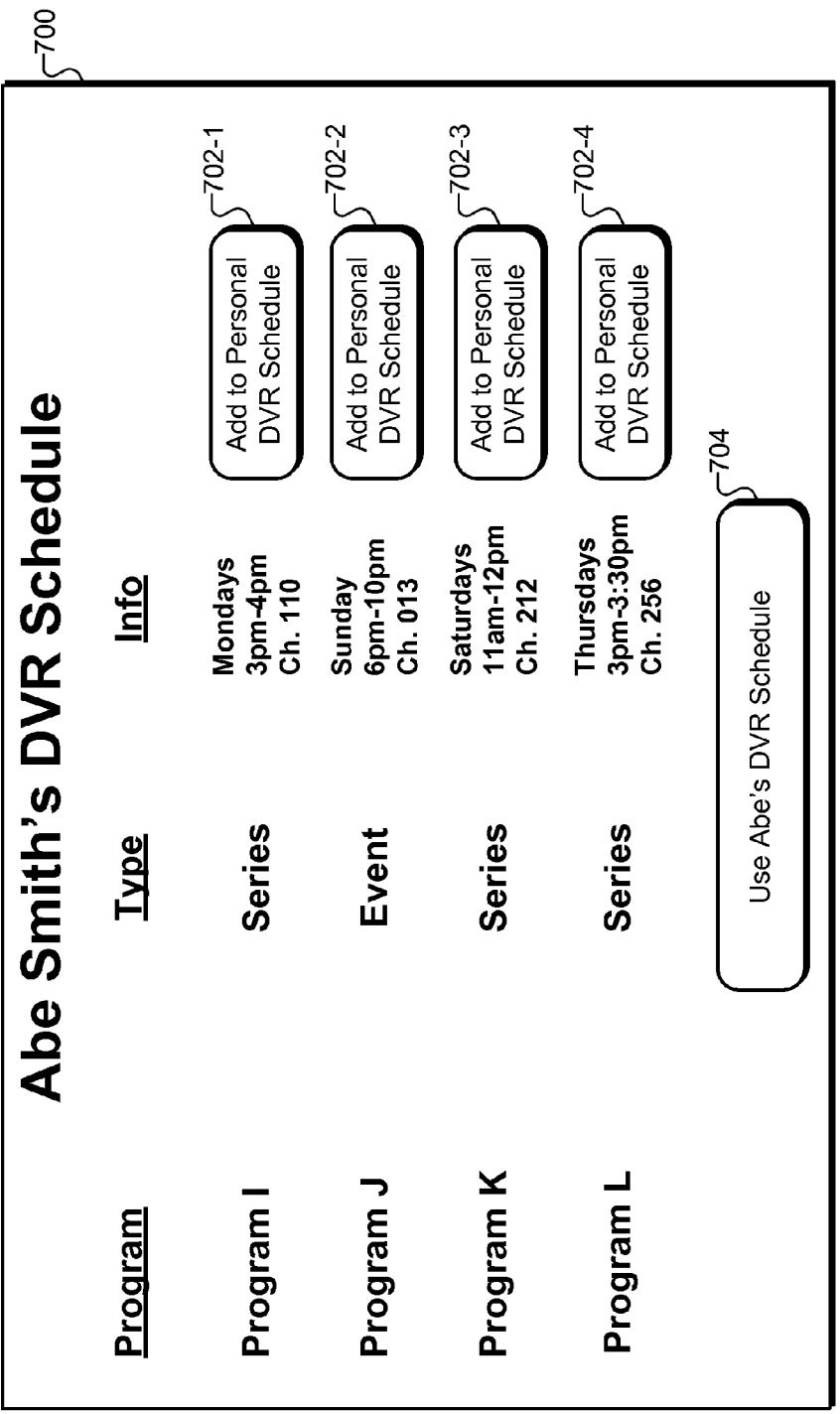

FIG. 7 illustrates an exemplary interface 700 that may be presented in response to a user selection of option 606 shown in FIG. 6 (i.e., the option to access the DVR schedule associated with a user named "Abe Smith"). As shown, the DVR schedule associated with the user named "Abe Smith" is displayed in interface 700. The user may browse through the DVR schedule and select various media content programs included in the DVR schedule for inclusion in the user's personal DVR schedule. For example, the user may select a media content program labeled "program I" for inclusion in the user's personal DVR schedule by selecting option 702-1, a media content program labeled "program J" for inclusion in the user's personal DVR schedule by selecting option 702-2, a media content program labeled "program K" for inclusion in the user's personal DVR schedule by selecting option 702-3, and/or a media content program labeled "program L" for inclusion in the user's personal DVR schedule by selecting option 702-4.

In some examples, personalization facility 104 may allow the user to use (i.e., designate) a DVR schedule associated with an individual user as the user's personal DVR schedule. For example, the user may use the DVR schedule associated with the user named "Abe Smith" as the user's personal DVR schedule by selecting an option 704 presented within interface 700.

Returning to FIG. 6, the user may select option 608 to provide a request to follow the user named "Abe Smith." As used herein, a request to "follow" a particular user refers to a request to have access to the user's DVR schedule. For example, a first user may follow a second user by receiving notifications of changes made to the second user's DVR schedule, having quick access (e.g., by way of a link) to the second user's DVR schedule, and/or in any other manner.

In response to the user selecting option 608, a request to follow the user named "Abe Smith" may be transmitted to personalization facility 104. Personalization facility 104 may receive the request and, in response, allow the user to follow the user named "Abe Smith" by providing the user with access to the DVR schedule associated with the user named "Abe Smith."

As mentioned, a user may browse through a master DVR schedule (e.g., by accessing interface 500) and/or through one or more individual DVR schedules associated with one or more other users (e.g., by accessing interfaces 600 and 700) in order to locate media content programs that may be of interest to the user. In some examples, the user may filter the master DVR schedule and/or one or more individual DVR schedules to present one or more media content programs that include or are related to one or more search terms. To this end, the user may provide input representative of one or more search terms (e.g., by way of interface 500 and/or interface 700). Personalization facility 104 may receive the input, and, in response, identify one or more media content programs included in the master DVR schedule and/or in the one or more individual DVR schedules. Personalization facility 104 may then present, within an interface accessible by the user, information representative of the identified one or more media content programs.

For example, the user may wish to include media content programs related to the search term "soccer" in his or her personal DVR schedule. By providing input to personalization facility 104 representative of the search term "soccer", the user may be presented, by way of an interface (e.g., an interface similar to interface 600), with information representative of media content programs associated with soccer (e.g., scheduled soccer matches, movies related to soccer, talk shows featuring soccer players, etc.).

In some examples, once the user has created his or her personal DVR schedule, he or she may publish the personal DVR schedule. In response, DVR schedule management facility 102 may include data representative of the DVR schedule in the data representative of the plurality of DVR schedules that is maintained by DVR schedule management facility 102. In this manner, the personal DVR schedule may be included in the plurality of DVR schedules upon which the master DVR schedule is based.

In some examples, personalization facility 104 may automatically update a user's personal DVR schedule once it has been created based on a change in the master DVR schedule and/or one or more individual DVR schedules upon which the personal DVR schedule is based. This may be performed in any suitable manner. For example, the personal DVR schedule may include media content programs selected from the master DVR schedule. Over time, as the popularity of media content programs included in the master DVR schedule changes, DVR schedule management facility 102 may update the master DVR schedule to include additional or alternative media content programs. In response, personalization facility 104 may update the personal DVR schedule to remove one or more media content programs from the personal DVR schedule that are no longer included in the master DVR schedule and/or add one or more media content programs to the personal DVR schedule that are now in the master DVR schedule.

Figure 8:
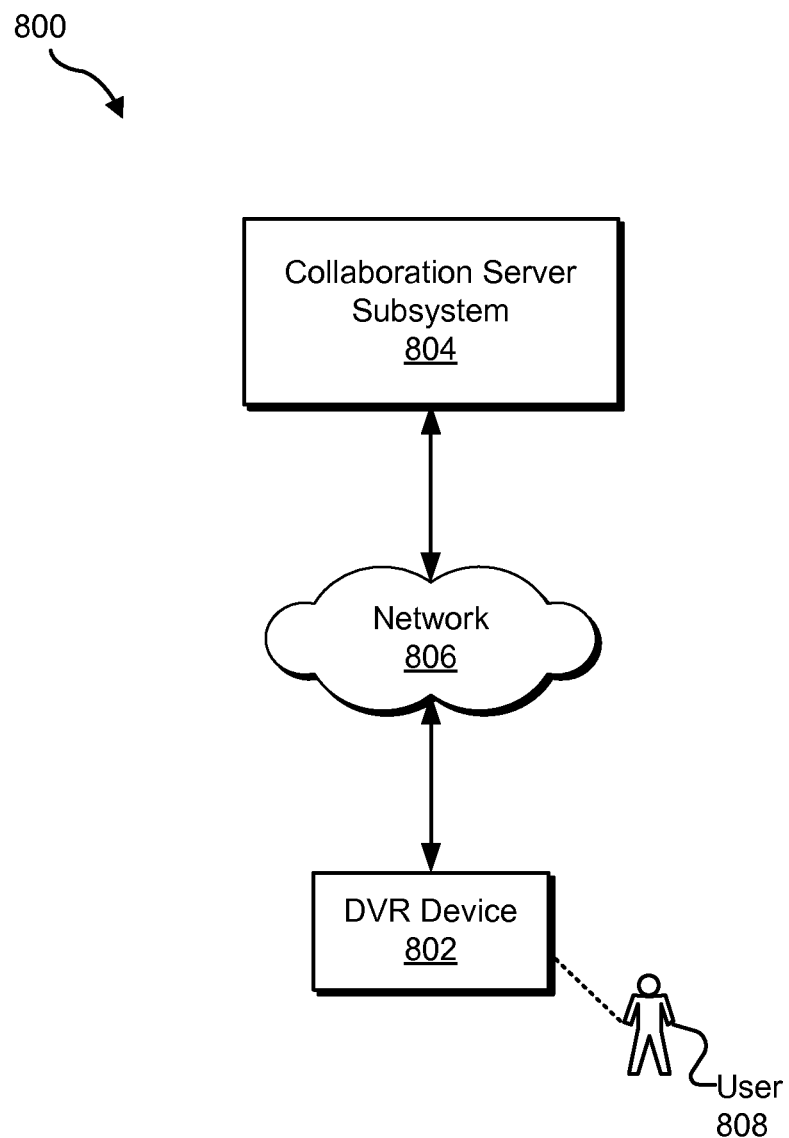
FIG. 8 shows an exemplary implementation of the DVR schedule collaboration system of FIG. 1 according to principles described herein.

FIG. 8 illustrates an exemplary implementation 800 of system 100 wherein a DVR device 802 is communicatively coupled to a collaboration server subsystem 804 by way of a network 806. As shown, DVR device 802 may be associated with (e.g., accessed by) a user 808. As will be described below, DVR schedule management facility 102, personalization facility 104, and storage facility 106 may each be implemented by DVR device 802 and/or collaboration server subsystem 804.

DVR device 802 may be configured to facilitate access by a user (e.g., user 808) to content (e.g., media content programs) provided by a media content provider and/or content stored locally by DVR device 802. DVR device 802 may be implemented by any suitable access device, such as a set-box device, a personal computer, a mobile device (e.g., a mobile phone, tablet device, etc.), a television device, and/or any other suitable computing device configured to access media content.

Collaboration server subsystem 804 may be associated with (e.g., managed by) a media content provider, a DVR service provider, and/or any other entity as may serve a particular implementation. Collaboration server subsystem 804 may be implemented by one or more computing devices as may serve a particular implementation.

DVR device 802 and collaboration server subsystem 804 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

DVR device 802 and collaboration server subsystem 804 may communicate using any suitable network. For example, as shown in FIG. 8, DVR device 802 and collaboration server subsystem 804 may be configured to communicate with each other by way of network 806. Network 806 may include one or more networks or types of networks capable of carrying communications and/or data signals between DVR device 802 and collaboration server subsystem 804. For example, network 806 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

In certain embodiments, system 100 may be implemented entirely by or within DVR device 802 or entirely by or within collaboration server subsystem 804. In other embodiments, components of system 100 may be distributed across DVR device 802 and collaboration server subsystem 804.

Figure 9:
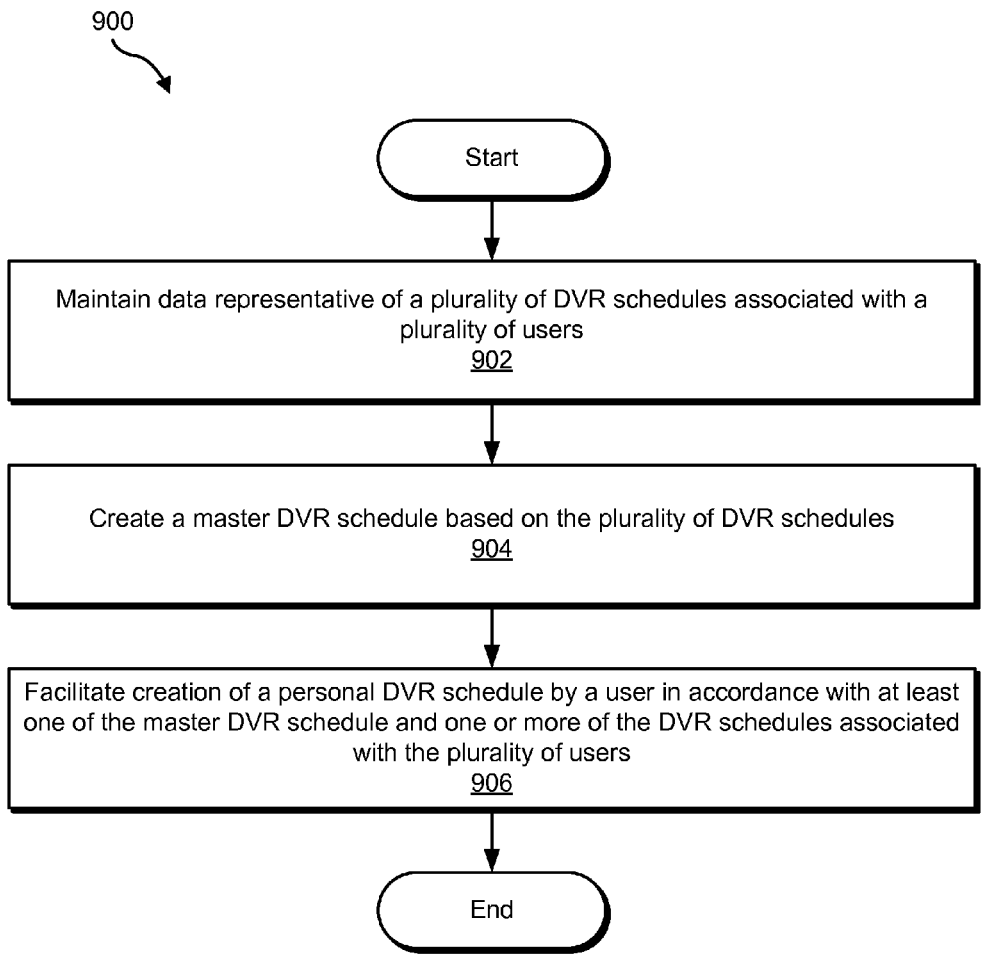
FIG. 9 illustrates an exemplary DVR schedule collaboration method according to principles described herein.

FIG. 9 illustrates an exemplary DVR schedule collaboration method 900. While FIG. 9 illustrates exemplary steps according to one embodiment, other embodiments may omit, add to, reorder, and/or modify any of the steps shown in FIG. 9. One or more of the steps shown in FIG. 9 may be performed by system 100 and/or any implementation thereof.

In step 902, a DVR schedule collaboration system maintains data representative of a plurality of DVR schedules associated with a plurality of users. Step 902 may be performed in any of the ways described herein.

In step 904, the DVR schedule collaboration system creates a master DVR schedule based on the plurality of DVR schedules. Step 904 may be performed in any of the ways described herein.

In step 906, the DVR schedule collaboration system facilitates creation of a personal DVR schedule by a user in accordance with at least one of the master DVR schedule and one or more of the DVR schedules associated with the plurality of users. Step 906 may be performed in any of the ways described herein.

Figure 10:
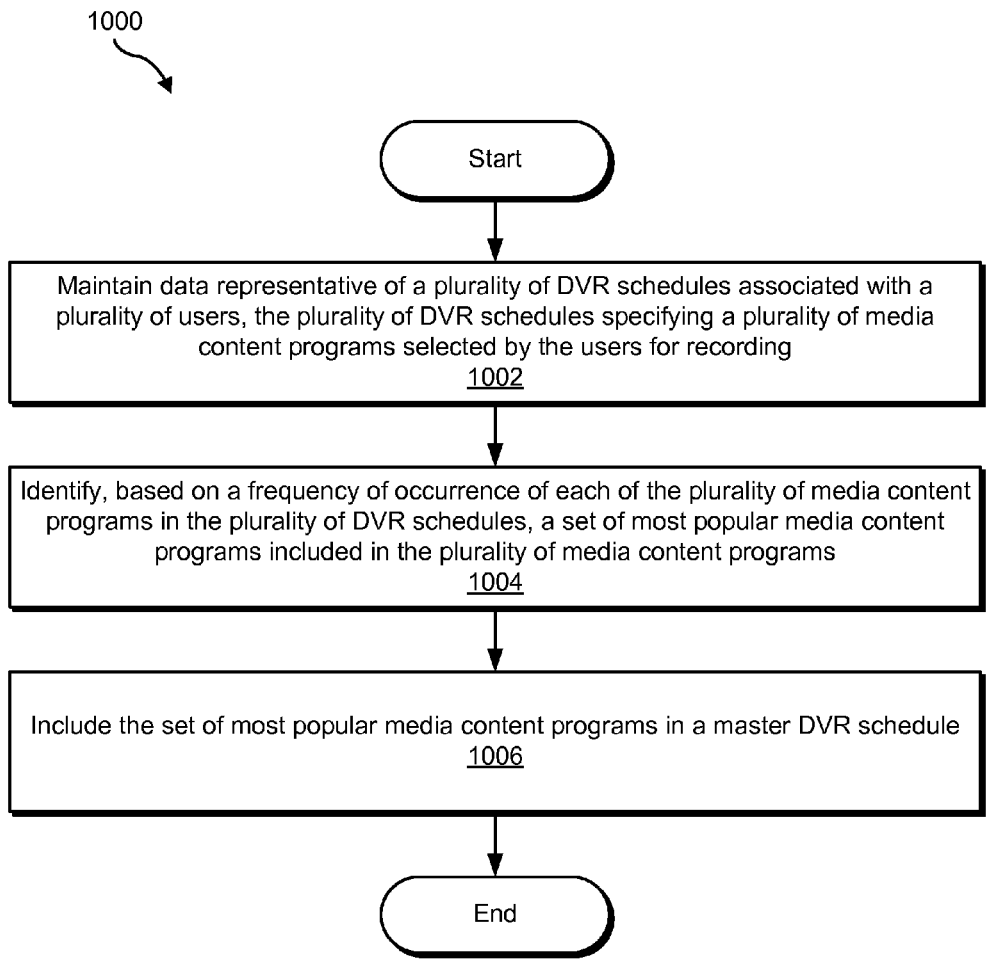
FIG. 10 illustrates another exemplary DVR schedule collaboration method according to principles described herein.

FIG. 10 illustrates another exemplary DVR schedule collaboration method 1000. While FIG. 10 illustrates exemplary steps according to one embodiment, other embodiments may omit, add to, reorder, and/or modify any of the steps shown in FIG. 10. One or more of the steps shown in FIG. 10 may be performed by system 100 and/or any implementation thereof.

In step 1002, a DVR schedule collaboration system maintains data representative of a plurality of DVR schedules associated with a plurality of users. The plurality of DVR schedules specify a plurality of media content programs selected by the users for recording. Step 1002 may be performed in any of the ways described herein.

In step 1004, the DVR schedule collaboration system identifies, based on a frequency of occurrence of each of the plurality of media content programs in the plurality of DVR schedules, a set of most popular media content programs included in the plurality of media content programs. Step 1004 may be performed in any of the ways described herein.

In step 1006, the DVR schedule collaboration system includes the set of most popular media content programs in a master DVR schedule. Step 1006 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a Compact Disc Read-Only Memory ("CD-ROM"), a Digital Versatile Disc ("DVD"), any other optical medium, a Random-Access Memory ("RAM"), a Programmable ROM ("PROM"), an Erasable PROM ("EPROM"), a Flash Electrically EPROM ("FLASH-EEPROM"), any other memory chip or cartridge, or any other tangible medium from which a computer can read.

Figure 11:
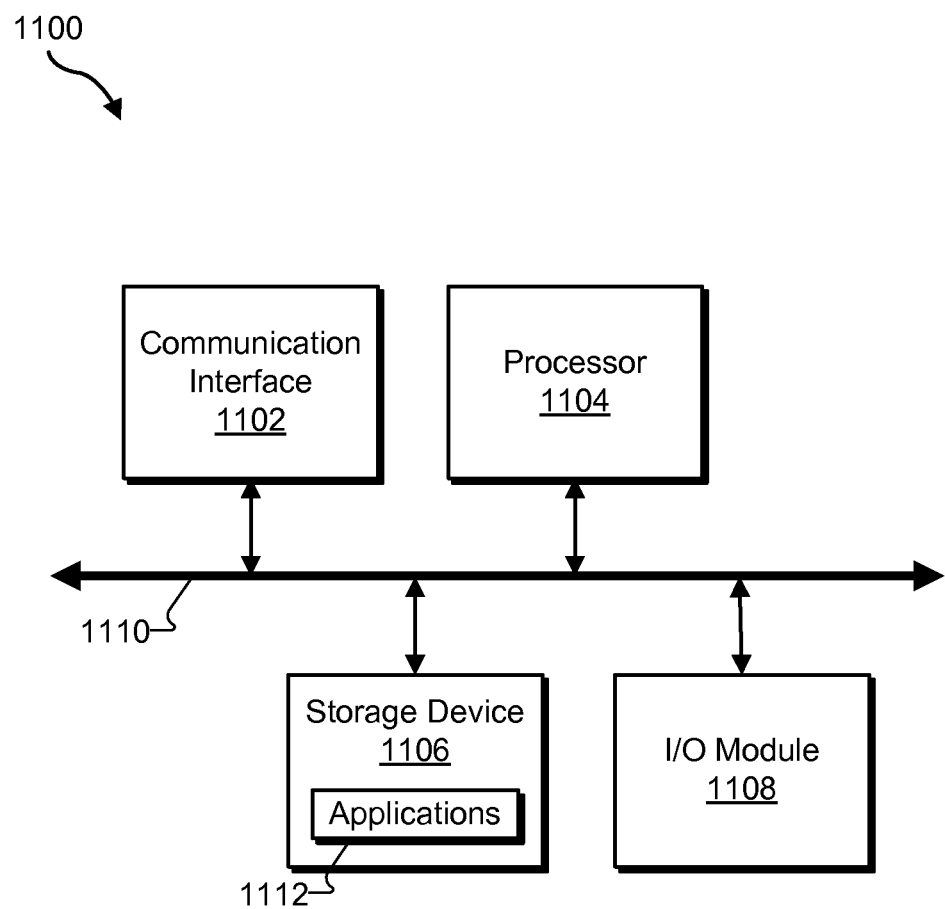
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected by way of a communication infrastructure 1110. While an exemplary computing device 1100 is shown in FIG. 11, the components illustrated in FIG. 11 are not intended to be limiting. Additional, fewer, or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may execute and/or direct execution of operations as directed by one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 1106. For example, data representative of one or more applications 1112 configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more GUI views and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with DVR schedule management facility 102 and/or personalization facility 104. Likewise, storage facility 106 may be implemented by or within storage device 1106. Such an implementation may be referred to as a computer-implemented system, such as a computer-implemented DVR schedule collaboration system 100 or a computing system 100.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    maintaining, by a digital video recording ("DVR") schedule collaboration system, data representative of a plurality of DVR schedules associated with a plurality of users;
    creating, by the DVR schedule collaboration system, a master DVR schedule based on the plurality of DVR schedules; and
    facilitating, by the DVR schedule collaboration system, creation of a personal DVR schedule by a user in accordance with at least one of the master DVR schedule and one or more of the DVR schedules associated with the plurality of users, the personal DVR schedule comprising instructions for a DVR device associated with the user to record one or more media content programs during one or more time slots;
    wherein the facilitating of the creation of the personal DVR schedule by the user comprises allowing the user to use the master DVR schedule as the personal DVR schedule by
        presenting a selectable option within an interface that is presented to the user, and
        designating, when the user selects the selectable option, the master DVR schedule as the personal DVR schedule by overwriting contents originally included in the personal DVR schedule with contents included in the master DVR schedule.

2. The method of claim 1, wherein the maintaining of the data representative of the plurality of DVR schedules associated with the plurality of users comprises:
    detecting that a particular user included in the plurality of users publishes a DVR schedule created by the particular user; and
    including data representative of the DVR schedule created by the particular user in the data representative of the plurality of DVR schedules.

3. The method of claim 1, wherein the maintaining of the data representative of the plurality of DVR schedules associated with the plurality of users comprises:
    detecting that the user publishes the personal DVR schedule; and
    including data representative of the personal DVR schedule in the data representative of the plurality of DVR schedules.

4. The method of claim 1, wherein the maintaining of the data representative of the plurality of DVR schedules created by the plurality of users comprises:
    detecting a modification by a particular user included in the plurality of users of a DVR schedule associated with the user and maintained by a DVR device associated with the particular user; and
    updating, based on the modification, a DVR schedule associated with the user and included in the plurality of DVR schedules maintained by the DVR schedule collaboration system.

5. The method of claim 1, wherein the plurality of DVR schedules include data specifying a plurality of media content programs selected by the users for recording during a plurality of time slots, and wherein the creating of the master DVR schedule based on the plurality of DVR schedules comprises:
    identifying a most popular media content program included in the plurality of media content programs and associated with a first time slot included in the plurality of time slots; and
    selecting the most popular media content program for inclusion in the master DVR schedule at the first time slot.

6. The method of claim 5, wherein the identifying of the most popular media content program comprises:
    identifying a media content program included in the plurality of media content programs that is most commonly specified in the plurality of DVR schedules; and
    designating the media content program as the most popular media content program.

7. The method of claim 5, wherein the creating of the master DVR schedule based on the plurality of DVR schedules further comprises:
    identifying a next most popular media content program included in the plurality of media content programs and that is associated with a second time slot included in the plurality of time slots that does not overlap with the first time slot; and
    selecting the next most popular media content program for inclusion in the master DVR schedule at the second time slot.

8. The method of claim 1, further comprising:
    receiving, by the DVR schedule collaboration system, user input representative of a media content attribute;
    wherein the creating of the master DVR schedule comprises
        identifying a plurality of media content programs that have the media content attribute, and
        including the identified media content programs in the master DVR schedule.

9. The method of claim 1, wherein the facilitating of the creation of the personal DVR schedule by the user further comprises allowing the user to use a particular DVR schedule included in the plurality of DVR schedules and associated with a particular user included in the plurality of users as the personal DVR schedule by
    presenting an additional selectable option within the interface, and
    designating, if the user selects the additional selectable option, the particular DVR schedule associated with the particular user as the personal DVR schedule.

10. The method of claim 1, further comprising automatically updating, by the DVR schedule collaboration system, the personal DVR schedule in response to one or more updates made to at least one of the master DVR schedule and the one or more DVR schedules.

11. The method of claim 1, further comprising:
    receiving, by the DVR schedule collaboration system, input provided by the user and representative of one or more search terms;

identifying, by the DVR schedule collaboration system, one or more media content programs included in the master DVR schedule that are associated with the one or more search terms; and presenting, by the DVR schedule collaboration system within the interface, information representative of the identified one or more media content programs.

12. The method of claim 1, further comprising:

receiving, by the DVR schedule collaboration system, input provided by the user and representative of one or more search terms;

identifying, by the DVR schedule collaboration system, one or more media content programs included in the one or more DVR schedules and that are associated with the one or more search terms; and presenting, by the DVR schedule collaboration system within the interface, information representative of the identified one or more media content programs.

13. The method of claim 1, further comprising:

receiving, by the DVR schedule collaboration system, input provided by the user and representative of a request to follow a DVR schedule associated with a particular user included in the plurality of users;

providing, by the DVR schedule collaboration system in response to the request, the user with access to the DVR schedule.

14. The method of claim 1, wherein the plurality of users are specified by the user.

15. The method of claim 1, embodied as computer-executable instructions on at least one non-transitory computer-readable medium.

16. A method comprising:

maintaining, by a digital video recording ("DVR") schedule collaboration system, data representative of a plurality of DVR schedules associated with a plurality of users, the plurality of DVR schedules specifying a plurality of media content programs selected by the users for recording;

identifying, by the DVR schedule collaboration system based on a frequency of occurrence of each of the plurality of media content programs in the plurality of DVR schedules, a set of most popular media content programs included in the plurality of media content programs; and including, by the DVR schedule collaboration system, the set of most popular media content programs in a master DVR schedule; and facilitating, by the DVR schedule collaboration system, creation of a personal DVR schedule by a user in accordance with the master DVR schedule, the personal DVR schedule comprising instructions for a DVR device associated with the user to record one or more media content programs;

wherein the facilitating of the creation of the personal DVR schedule by the user comprises allowing the user to use the master DVR schedule as the personal DVR schedule by presenting a selectable option within an interface that is presented to the user, and designating, when the user selects the selectable option, the master DVR schedule as the personal DVR schedule by overwriting contents originally included in the personal DVR schedule with contents included in the master DVR schedule.

17. The method of claim 16, embodied as computer-executable instructions on at least one non-transitory computer-readable medium.

18. A system comprising:

a digital video recording ("DVR") schedule management facility that maintains data representative of a plurality of DVR schedules associated with a plurality of users, and creates a master DVR schedule based on the plurality of DVR schedules; and a personalization facility communicatively coupled to the DVR schedule management facility and that facilitates creation of a personal DVR schedule by a user in accordance with at least one of the master DVR schedule and one or more of the DVR schedules associated with the plurality of users, the personal DVR schedule comprising instructions for a DVR device associated with the user to record one or more media content programs during one or more time slots;

wherein the personalization facility facilitates the creation of the personal DVR schedule by the user by allowing the user to use the master DVR schedule as the personal DVR schedule by presenting a selectable option within an interface that is presented to the user, and designating, when the user selects the selectable option, the master DVR schedule as the personal DVR schedule by overwriting contents originally included in the personal DVR schedule with contents included in the master DVR schedule.

19. The system of claim 18, wherein the personalization facility further facilitates the creation of the personal DVR schedule by the user by allowing the user to use a particular DVR schedule included in the plurality of DVR schedules and associated with a particular user included in the plurality of users as the personal DVR schedule by presenting an additional selectable option within the interface, and designating, if the user selects the additional selectable option, the particular DVR schedule associated with the particular user as the personal DVR schedule.

* * * * *